(12) United States Patent
Sako et al.

(10) Patent No.: US 9,817,630 B2
(45) Date of Patent: Nov. 14, 2017

(54) SERVER AND CLIENT TERMINAL FOR PROVIDING A RESULT BASED ON ZOOM OPERATION

(71) Applicant: SONY CORPORATION, Tokyo (JP)

(72) Inventors: Yoichiro Sako, Tokyo (JP); Takatoshi Nakamura, Kanagawa (JP); Mitsuru Takehara, Tokyo (JP); Kohei Asada, Kanagawa (JP); Kazuyuki Sakoda, Chiba (JP); Katsuhisa Aratani, Kanagawa (JP); Kazuhiro Watanabe, Tokyo (JP); Akira Tange, Tokyo (JP); Hiroyuki Hanaya, Kanagawa (JP); Yuki Koga, Tokyo (JP); Tomoya Onuma, Shizuoka (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/741,018

(22) Filed: Jun. 16, 2015

(65) Prior Publication Data

US 2015/0301790 A1 Oct. 22, 2015

Related U.S. Application Data

(63) Continuation of application No. 13/927,392, filed on Jun. 26, 2013, now Pat. No. 9,088,723.

(30) Foreign Application Priority Data

Jul. 6, 2012 (JP) ................................. 2012-152088

(51) Int. Cl.
*G06F 3/16* (2006.01)
*H04N 5/232* (2006.01)
(Continued)

(52) U.S. Cl.
CPC .............. *G06F 3/165* (2013.01); *H04L 67/00* (2013.01); *H04L 67/38* (2013.01);
(Continued)

(58) Field of Classification Search
CPC ... H04N 2201/3264; H04N 2201/3253; H04N 5/23296; H04N 21/41407; H04N 5/772;
(Continued)

(56) References Cited

U.S. PATENT DOCUMENTS 6,931,138 B2 * 8/2005 Kawamura ............ H04R 1/406
348/231.4
9,088,723 B2 * 7/2015 Sako ................ H04N 21/41407
(Continued)

FOREIGN PATENT DOCUMENTS

JP 11-316769 A 11/1999
JP 2002-238080 A 8/2002
(Continued)

OTHER PUBLICATIONS

Japanese Office Action dated Sep. 29, 2015 in patent application No. 2015152088.
(Continued)

*Primary Examiner* — Nhan T Tran
(74) *Attorney, Agent, or Firm* — Chip Law Group

(57) ABSTRACT

There is provided a server including a reception section which receives, from a client terminal, present position information showing a position of the client terminal, and direction information showing an orientation of the client terminal, a retrieval section which retrieves sensory data to which detection position information is added corresponding to a position in a vicinity of an axial line extending in a direction shown by the direction information from the
(Continued)

position of the client terminal, and a transmission section which transmits the sensory data retrieved by the retrieval section to the client terminal.

15 Claims, 10 Drawing Sheets

(51) Int. Cl.
| | |
|---|---|
| H04N 21/414 | (2011.01) |
| H04N 5/77 | (2006.01) |
| H04N 21/258 | (2011.01) |
| H04N 21/2668 | (2011.01) |
| H04N 21/422 | (2011.01) |
| H04N 21/439 | (2011.01) |
| H04N 21/4728 | (2011.01) |
| H04N 21/81 | (2011.01) |
| H04R 1/40 | (2006.01) |
| H04R 3/00 | (2006.01) |
| H04S 3/00 | (2006.01) |
| H04L 29/08 | (2006.01) |
| H04W 4/00 | (2009.01) |
| H04W 4/02 | (2009.01) |
| H04L 29/06 | (2006.01) |
| H04N 5/76 | (2006.01) |
| H04N 9/82 | (2006.01) |
| H04N 1/00 | (2006.01) |
| G01S 5/00 | (2006.01) |

(52) U.S. Cl.
CPC ..... *H04N 1/00244* (2013.01); *H04N 5/23296* (2013.01); *H04N 5/76* (2013.01); *H04N 5/772* (2013.01); *H04N 9/8211* (2013.01); *H04N 21/25841* (2013.01); *H04N 21/2668* (2013.01); *H04N 21/41407* (2013.01); *H04N 21/42203* (2013.01); *H04N 21/439* (2013.01); *H04N 21/4728* (2013.01); *H04N 21/8106* (2013.01); *H04R 1/406* (2013.01); *H04R 3/00* (2013.01); *H04S 3/00* (2013.01); *H04W 4/006* (2013.01); *H04W 4/027* (2013.01); *G01S 5/0027* (2013.01)

(58) Field of Classification Search
CPC ................ H04N 21/25841; H04N 9/8211; G06F 3/165; H04L 67/00
USPC ....... 348/240.99, 211.2, 207.1, 231.4, 231.6, 348/211.1, 207.99; 381/92
See application file for complete search history.

(56) References Cited

U.S. PATENT DOCUMENTS

| | | | | |
|---|---|---|---|---|
| 2005/0281410 | A1* | 12/2005 | Grosvenor | H04H 60/47 381/61 |
| 2009/0303350 | A1* | 12/2009 | Terada | H04N 5/772 348/231.4 |
| 2012/0230512 | A1* | 9/2012 | Ojanper | H04R 3/00 381/92 |
| 2014/0010391 | A1* | 1/2014 | Ek | G06F 3/011 381/310 |
| 2014/0105406 | A1* | 4/2014 | Ojanper | H04R 29/005 381/56 |

FOREIGN PATENT DOCUMENTS

| | | |
|---|---|---|
| JP | 2009-141469 A | 6/2009 |
| JP | 2011-022112 A | 2/2011 |
| WO | 2011/064438 A1 | 6/2011 |

OTHER PUBLICATIONS

Office Action for CN Patent Application No. 201310263956.6, dated Dec. 23, 2016, 7 pages of Office Action and 9 pages of English Translation.

* cited by examiner

FIG. 3

| AUDIO DATA | SOUND COLLECTION POSITION INFORMATION | CLASSIFICATION INFORMATION | SOUND COLLECTOR INFORMATION |
|---|---|---|---|
| S1 | P1 | C1 | M1 |
| S2 | P2 | C2 | M2 |
| S3 | P3 | C3 | M3 |
| ... | ... | ... | ... |

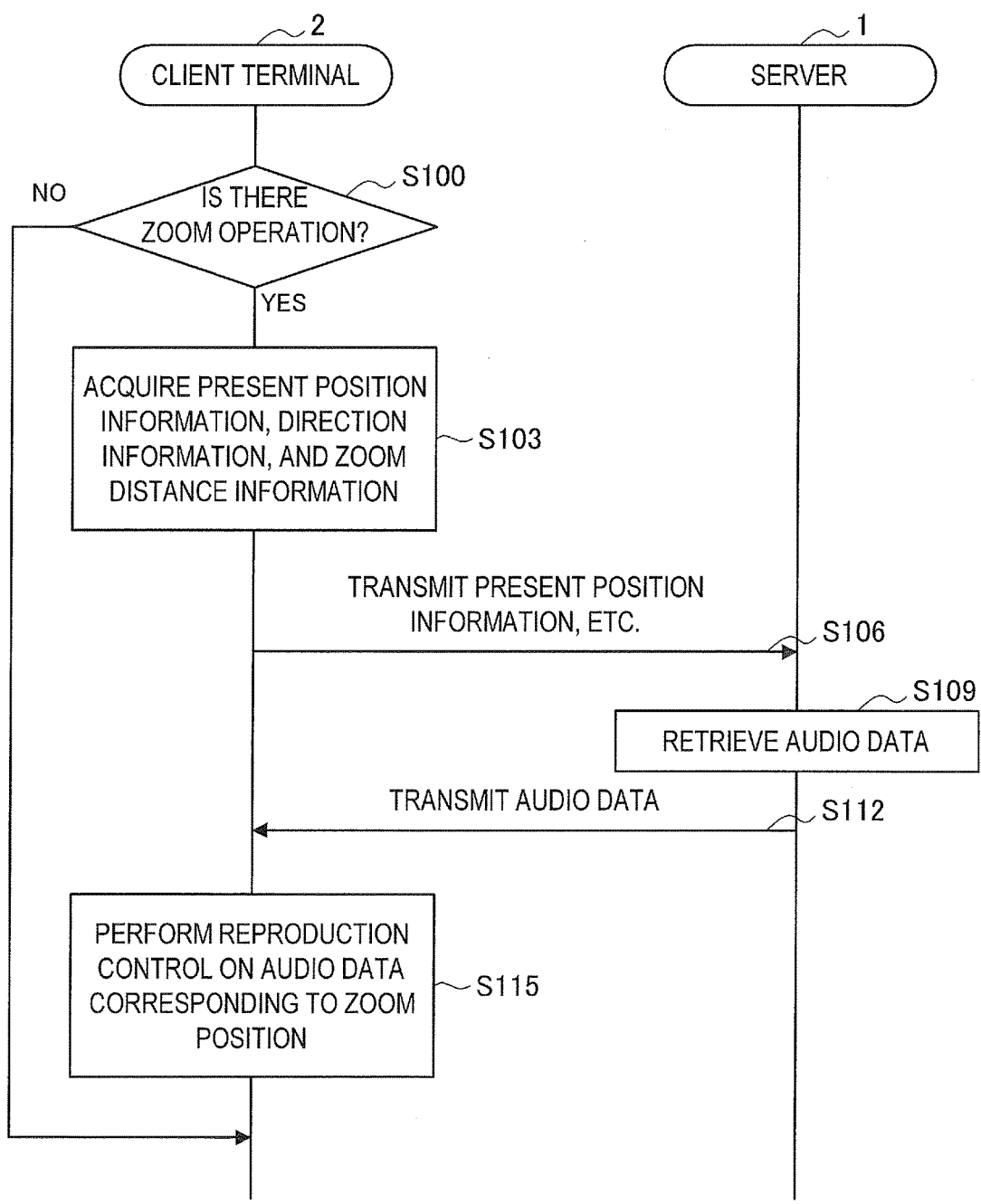

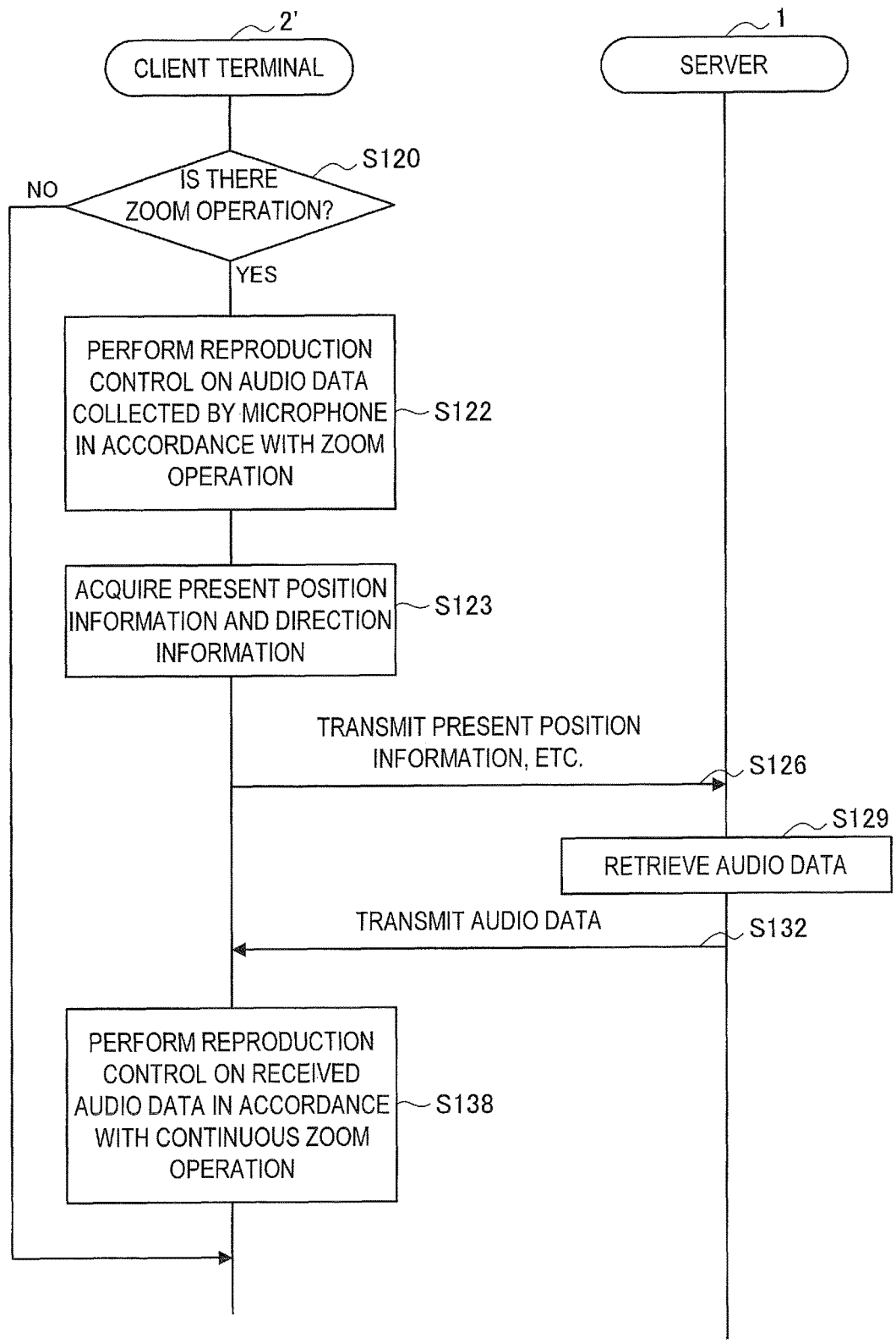

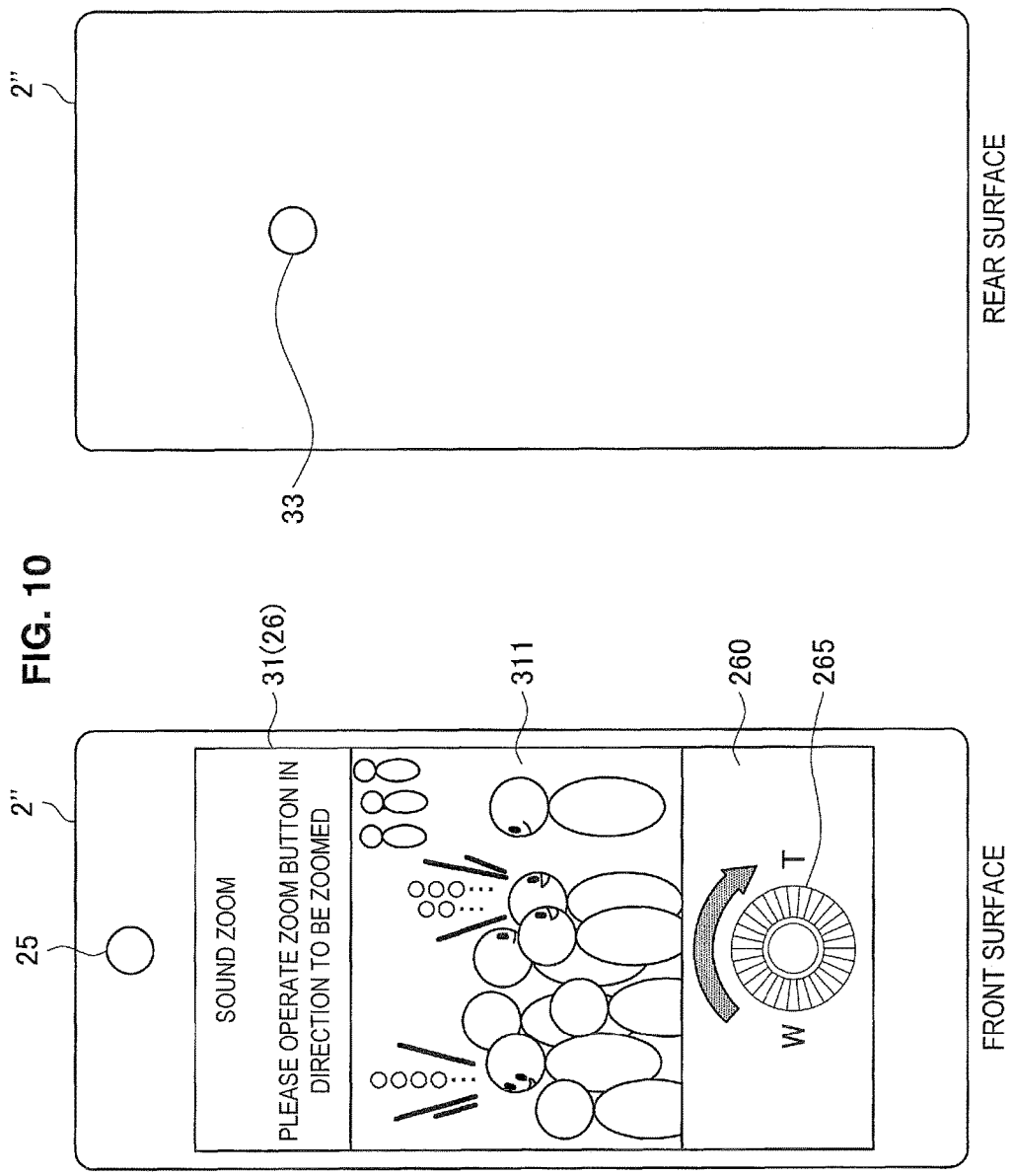

SERVER AND CLIENT TERMINAL FOR PROVIDING A RESULT BASED ON ZOOM OPERATION

CROSS-REFERENCE TO RELATED APPLICATIONS

The present application is a continuation application of U.S. patent application Ser. No. 13/927,392, filed Jun. 26, 2013, which claims the benefit of priority from prior Japanese Priority Patent Application JP 2012-152088 filed in the Japan Patent Office on Jul. 6, 2012, the entire content of which is hereby incorporated by reference.

BACKGROUND

The present disclosure relates to a server, a client terminal, and a program.

Usually, when a zoom operation is performed in an imaging apparatus such as a digital camera or a video camera, an image focused on a point in the distance is taken by a telescopic function. On the other hand, in recent years, zoom sound collection technology has been proposed which emphasizes target sounds in accordance with the zoom position.

For example, JP 2002-204493A discloses a zoom microphone apparatus which collects target sounds from a distance at the time of telephotography in accordance with the zoom position. Further, JP 2006-339991A discloses a multichannel sound collection apparatus which can change the zoom of sounds at the time of reproduction.

SUMMARY

However, both of the above described zoom sound collection technologies perform noise suppression or gain control for the sound waves actually collected in a real space by a single microphone, and there is a limit to the zoom range. Further, apart from sound, JP 2002-204493A and JP 2006-339991A do not consider outputting tactile sense (force sense) or smell in accordance with the zoom position.

On the other hand, if a stimulation of senses, such as any such distant sounds, force senses, or smells, can be output in accordance with a zoom operation, a user can easily experience a virtual world trip.

Accordingly, the present disclosure presents a new and improved server, client terminal, and program capable of continuously performing a virtual experience zoom in the direction in which the client terminal is facing.

According to an embodiment of the present disclosure, there is provided a server including a reception section which receives, from a client terminal, present position information showing a position of the client terminal, and direction information showing an orientation of the client terminal, a retrieval section which retrieves sensory data to which detection position information is added corresponding to a position in a vicinity of an axial line extending in a direction shown by the direction information from the position of the client terminal, and a transmission section which transmits the sensory data retrieved by the retrieval section to the client terminal.

According to an embodiment of the present disclosure, there is provided a client terminal including a transmission section which transmits present position information showing a position of a client terminal, and direction information showing an orientation of the client terminal, a reception section which receives sensory data to which detection position information is added corresponding to a position in a vicinity of an axial line extending in a direction shown by the direction information from the position of the client terminal, and an output control section which performs control in a manner that the sensory data received by the reception section is output.

According to an embodiment of the present disclosure, there is provided a program for causing a computer to function as a transmission section which transmits present position information showing a position of a client terminal, and direction information showing an orientation of the client terminal, a reception section which receives sensory data to which detection position information is added corresponding to a position in a vicinity of an axial line extending in a direction shown by the direction information from the position of the client terminal, and an output control section which performs control in a manner that the sensory data received by the reception section is output.

According to the embodiments of the present disclosure described above, it becomes possible to continuously perform a virtual experience zoom in the direction in which the client terminal is facing.

BRIEF DESCRIPTION OF THE DRAWINGS

FIG. 3 is a figure which shows an example of data stored in an audio data DB;

FIG. 8 is a flow chart which shows the operation processes of the infinite zoom system according to the present embodiment;

FIG. 9 is a flow chart which shows other operation processes of the infinite zoom system according to the present embodiment; and FIG. 10 is a figure which shows another example of a zoom operation screen according to the present embodiment.

DETAILED DESCRIPTION OF THE EMBODIMENT(S)

Figure 1:
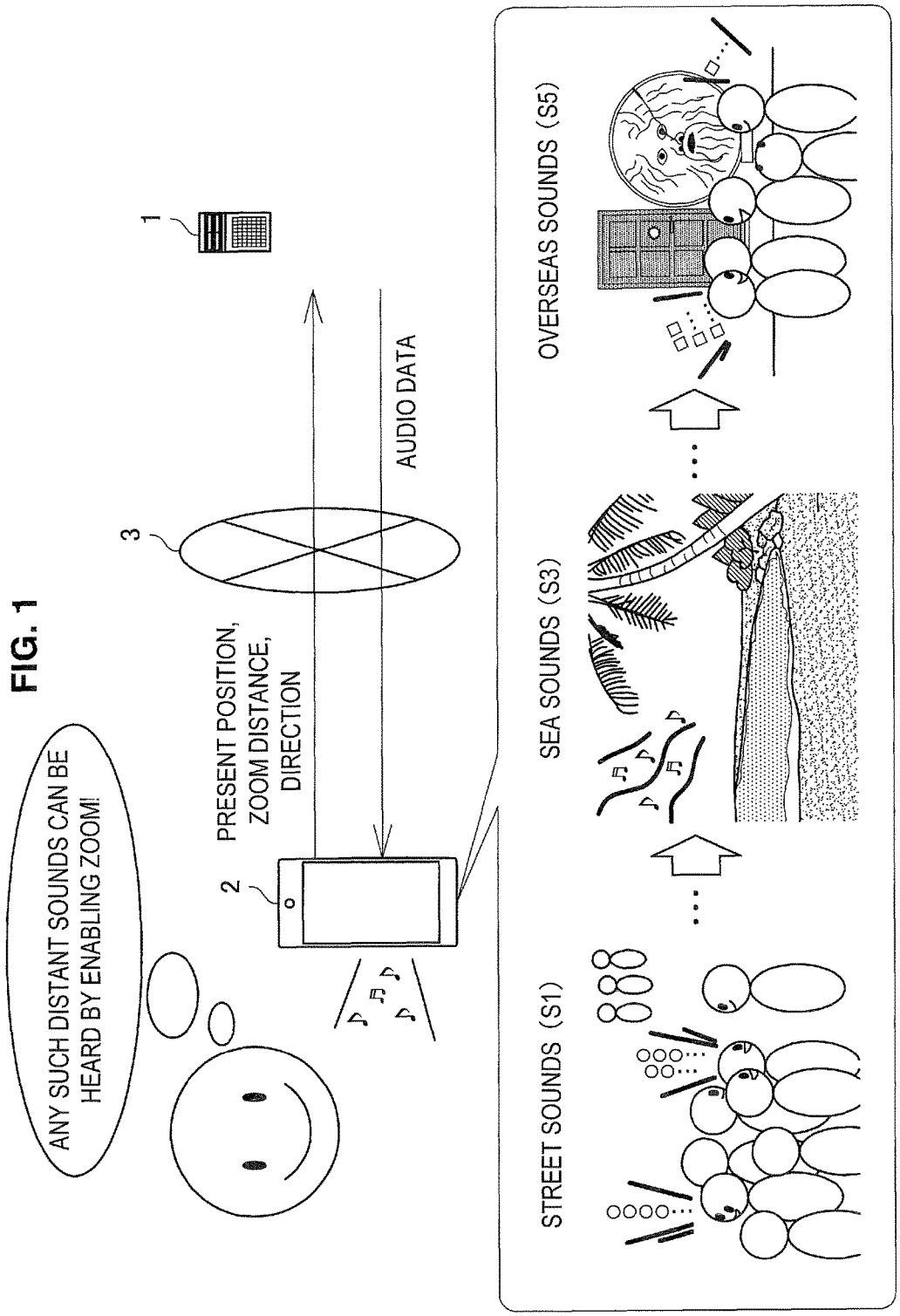
FIG. 1 is a figure for describing an outline of an infinite zoom system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be given in the following order:
1. Outline of an Infinite Zoom System According to an Embodiment of the Present Disclosure
2. Basic Configuration
  2-1. Server
  2-2. Client terminal 3. Operation Processes
4. Supplementation
5. Conclusion

1. Outline of an Infinite Zoom System According to an Embodiment of the Present Disclosure First, an outline of an infinite zoom system according to an embodiment of the present disclosure will be described with reference to FIG. 1. As shown in FIG. 1, an infinite zoom system according to an embodiment of the present disclosure has a server 1 and a client terminal 2. The server 1 and the client terminal 2 are capable of being connected via a network 3.

Here, as described above, zoom sound collection technology, which emphasizes target sounds in accordance with the zoom position, performs noise suppression or gain control for the sound waves actually collected in a real space by a single microphone, and there is a limit to the zoom range (zoom distance). Further, outputting tactile sense (force sense) or smell in accordance with the zoom position is not considered at all.

Accordingly, according to an embodiment of the present disclosure, it becomes possible for a user to experience a virtual world trip, by outputting a stimulation of senses, such as any such distant sounds, force senses, or smells, in accordance with a zoom operation.

For example, when an operation of sound zoom is performed by a user facing the client terminal 2 in a direction to be zoomed, the client terminal 2, as shown in FIG. 1, transmits present position information, direction information, and a zoom distance to the server 1, and performs a request of audio data to the server 1. Next, the server 1 retrieves audio data corresponding to the zoom position, based on the information received from the client terminal 2, and transmits the retrieved audio data to the client terminal 2. Then, the client terminal 2 reproduces (outputs) the received audio data from a speaker, and can present the user with sounds of the zoom position.

In this way, for example, it is possible to continuously perform a virtual infinite zoom in the direction in which the client terminal 2 is facing, by enabling the server 1 to retrieve audio data collected throughout the world in advance. For example, as shown in FIG. 1, when a zoom-in operation is performed in the case where street sounds S1 are output corresponding to the zoom position, the user can listen to sea sounds S3 by extending the zoom distance to the sea located on the other side of the street. Then, when the user continues the zoom-in operation further, the user can listen to overseas sounds S5 by extending the zoom distance to the other side of the sea.

Finally, the zoom position circles the globe, by continuously performing such a virtual zoom in front in a roughly horizontal direction, and the user can experience a virtual world trip by listening to sounds from all parts of the world. Further, the user can intuitively understand the direction of the zoom position, by zooming in the direction in which the client terminal 2 is actually facing.

Heretofore, an outline of an infinite zoom system according to an embodiment of the present disclosure has been described. To continue, a configuration of the server 1 and the client terminal 2 included in the infinite zoom system will be described in detail.

Note that in FIG. 1, while a smart phone is shown in the figure as the client terminal 2, the client terminal 2 according to the present embodiment is not limited to this, and may be, for example, a digital camera, a video camera, a PDA (Personal Digital Assistant), a PC (Personal Computer), a mobile phone, a portable music player, a portable video processing apparatus, a portable game machine, a telescope, binoculars or the like.

2. Basic Configuration

[2-1. Server]

Figure 2:
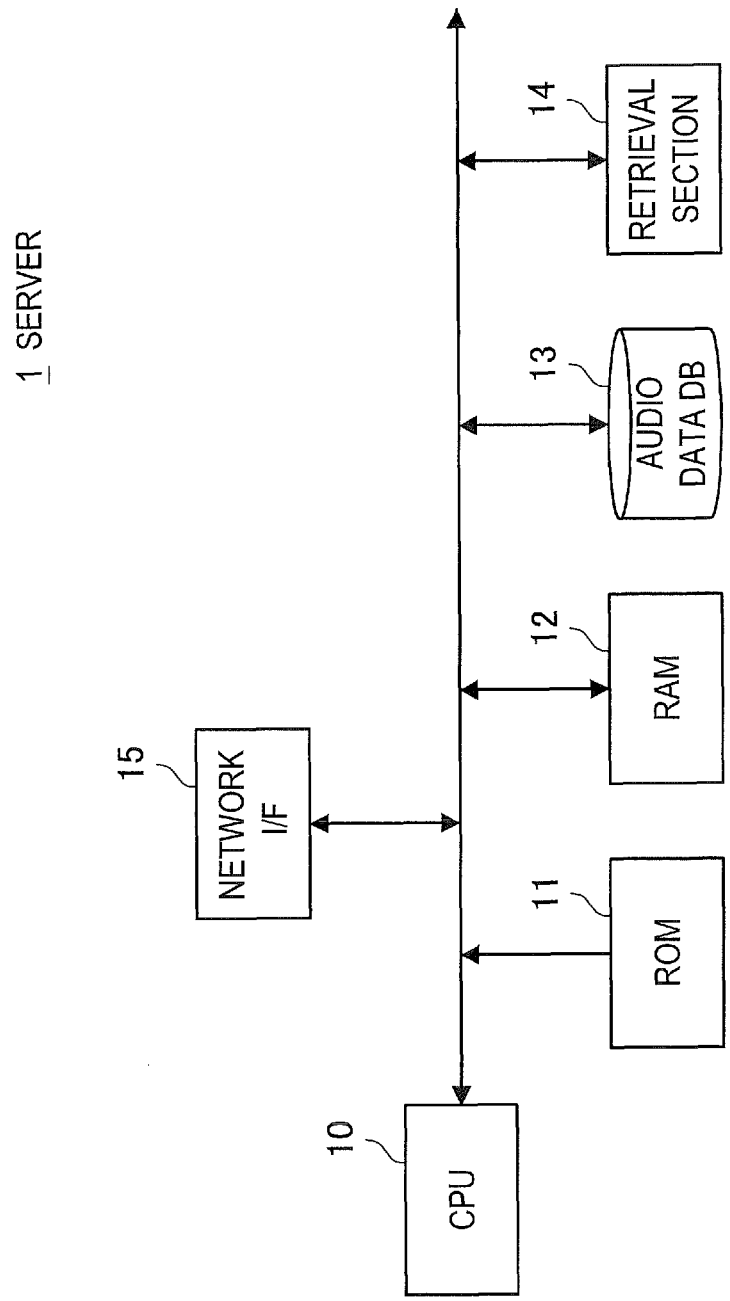
FIG. 2 is a block diagram which shows a configuration of a server according to the present embodiment.

FIG. 2 is a block diagram which shows a configuration of the server 1 according to the present embodiment. As shown in FIG. 2, the server 1 has a CPU 10, a ROM 11, a RAM 12, an audio data DB (database) 13, a retrieval section 14, and a network interface (I/F) 15. Hereinafter, each of the constituent elements will be described.

(Audio data DB 13)

The audio data DB 13 is a storage section which stores audio data to which sound collection position information or the like has been added. Here, an example of data stored by the audio data DB 13 is shown in FIG. 3.

As shown in FIG. 3, the audio data DB 13 according to the present embodiment stores each audio data S1 to S3 in an associated state with sound collection position information P1 to P3, classification information C1 to C3, and sound collector information M1 to M3. The sound collection position information P is detection position information which shows the position (for example, longitude, latitude and altitude) at which the audio data was collected (detected). The classification information C is information which shows a classification (for example, street, sea, mountains, sightseeing area, famous spot or the like) of the audio data. The sound collector information M is acquirer information which shows the person who collected (acquired) the audio data.

Note that, other than each type of information shown in FIG. 3, information such as the sound collection time or the weather of the sound collection time may be associated with each audio data S.

(Retrieval Section 14)

The retrieval section 14 retrieves audio data corresponding to the zoom position, from among the audio data stored in the audio data DB 13, based on the present position information, direction information and zoom distance information of the client terminal 2, which is received from the client terminal 2. Note that the present position information is information which shows the present position (longitude, latitude and altitude) of the client terminal 2, the direction information is information which shows the orientation (the facing direction) of the client terminal 2, and the zoom distance information is information which shows the distance from the position of the client terminal 2 to the zoom position. Here, a retrieval method of the retrieval section 14 according to the present embodiment will be specifically described with reference to FIG. 4.

Figure 4:
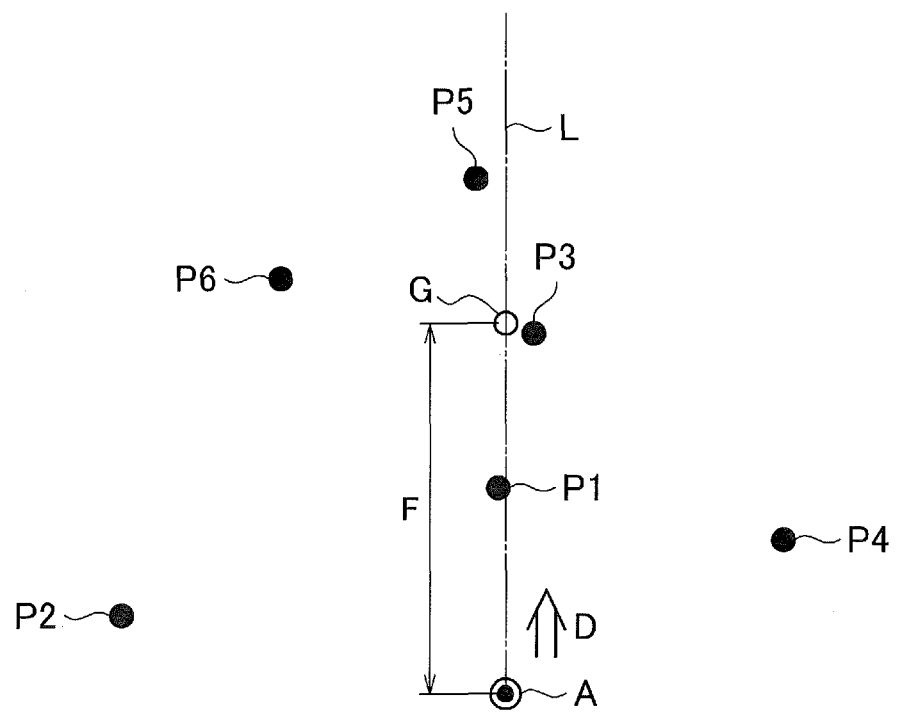
FIG. 4 is a figure for describing a retrieval method of audio data according to the present embodiment.

FIG. 4 is a figure for describing a retrieval method of audio data according to the present embodiment. As shown in FIG. 4, the retrieval section 14 recognizes a positional relation of each of the sound collection positions P1 to P6 of the audio data with the present position A of the client terminal 2. Further, the retrieval section 14 recognizes an axial line L which extends in a direction D shown by the direction information from the present position A. In addition, the retrieval section 14 recognizes, on the axial line L, the position of a zoom distance F shown by the zoom distance information, from the present position A, as a zoom position G. In this case, the retrieval section 14 outputs audio data of the sound collection position P3, which is positioned in the vicinity of the zoom position G, as a retrieval result.

Further, the retrieval section 14 may also output audio data of the sound collection position P1, which is in the vicinity of the axial line L, and is positioned within (between the present position A and the zoom position G) the zoom distance F from the present position A, as a retrieval result.

Note that in the case where the retrieval section 14 according to the present embodiment further acquires information, such as the elevation angle of the client terminal 2, the present time of the sound collection position, or the present weather of the sound collection position, by also considering this information, audio data may be retrieved which has been collected in a state closer to that of the present condition. In this way, a user can acquire experiences so that a world trip is made in real time.

(Network I/F 15)

The network I/F 15 is a communication module for performing transmission/reception of data with the client terminal 2 via the network 3. For example, the network I/F 15 according to the present embodiment receives position information, direction information, and zoom distance information, and transmits one or more of the audio data retrieved by the retrieval section 14.

(CPU 10, ROM 11 and RAM 12)

A software program or the like for the above described retrieval of audio data by the retrieval section 14, or for transmitting the retrieved audio data to the client terminal 2 by the network I/F 15, is stored in the ROM 11. Further, the CPU 10 executes processes by using the RAM 12 as a work area, in accordance with the above described software program stored in the ROM 11.

Heretofore, a configuration of the server 1 according to the present embodiment has been described in detail. To continue, a configuration of the client terminal 2 according to the present embodiment will be described with reference to FIGS. 5 and 6.

[2-2. Client Terminal]

(External Appearance Configuration)

Figure 5:
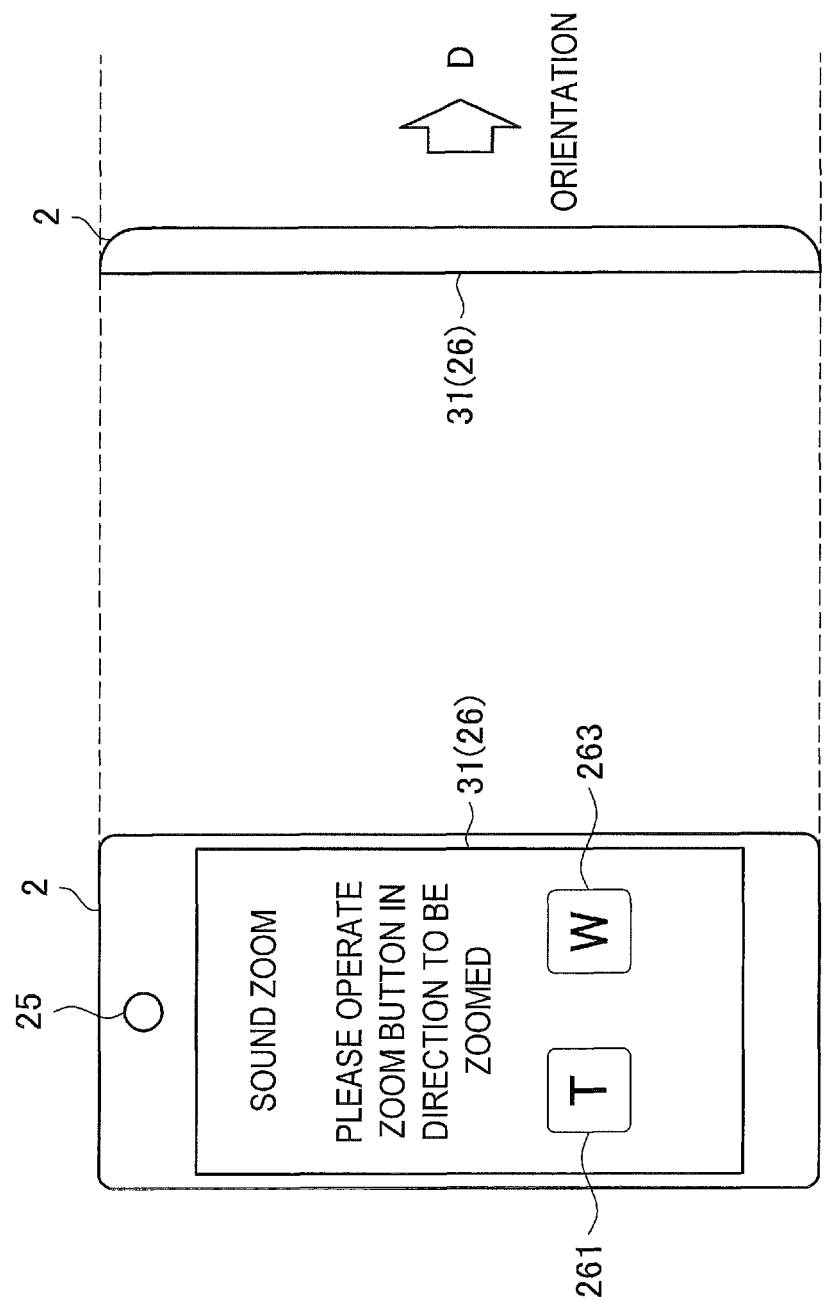
FIG. 5 is a figure for describing the external appearance of a client terminal according to the present embodiment.

FIG. 5 is a figure for describing the external appearance of the client terminal 2 according to the present embodiment. As shown in FIG. 5, the client terminal 2 includes a display section 31 and a speaker 25 on a front surface. Note that the display section 31 may be a touch panel display which serves as the functions of an operation input section 26.

Further, an operation screen for accepting zoom operations by a user is displayed on the display section 31. For example, as shown in FIG. 5, a T (telephoto) button 261 for performing a zoom-in operation and a W (wide) button 263 for performing a zoom-out operation are displayed.

Further, in the present embodiment, as shown in FIG. 5, the orientation of the client terminal 2 is set as a direction D which is directed to the surface opposite from the surface including the display section 31 of the client terminal 2. Note that the direction D defined in FIG. 5 is an example of the orientation of the client terminal 2, and a direction which another surface (part) of the client terminal 2 is facing may be set.

(Internal Configuration)

Figure 6:
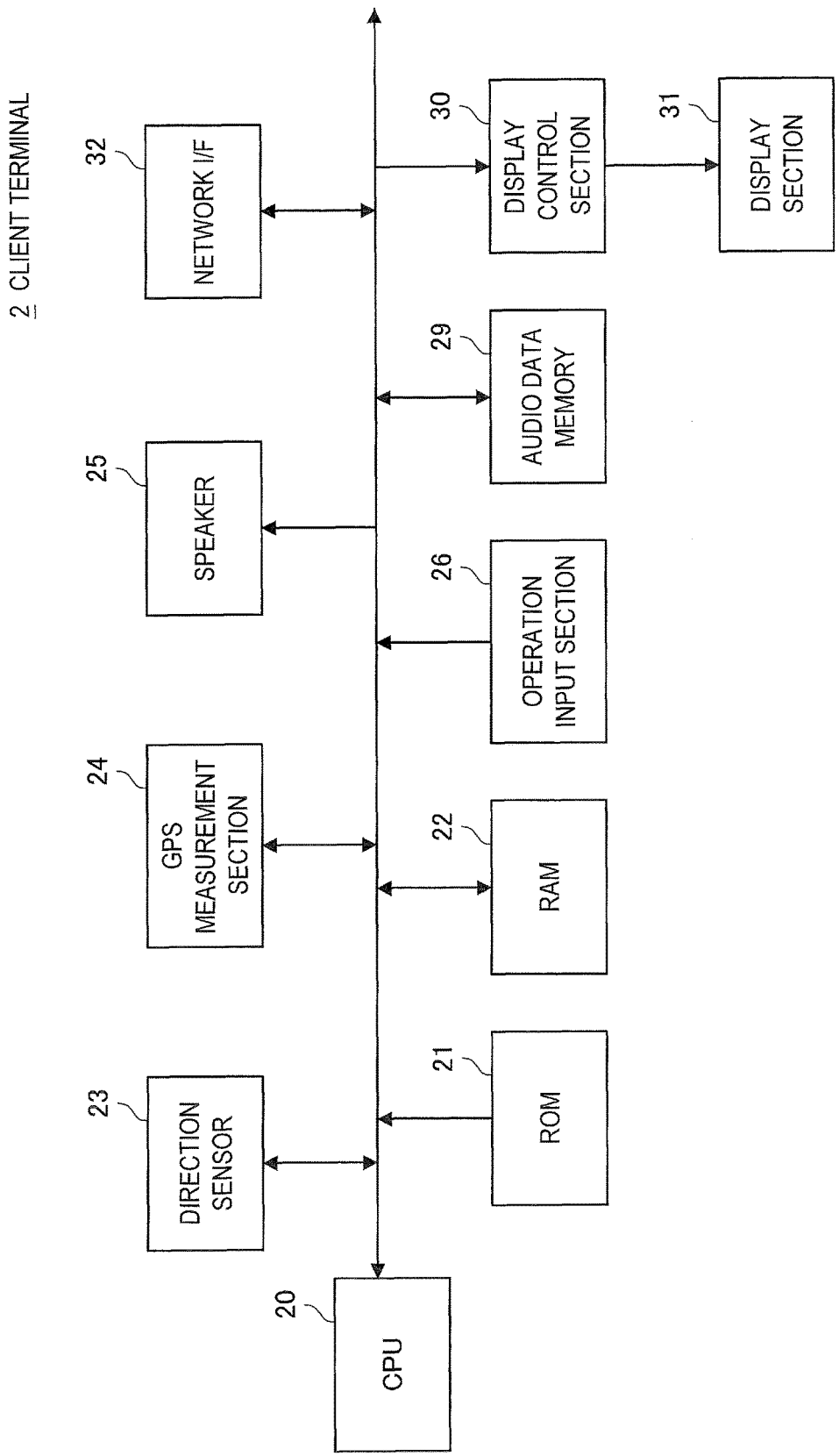
FIG. 6 is a block diagram which shows a configuration of the client terminal according to the present embodiment.

FIG. 6 is a block diagram which shows a configuration of the client terminal 2 according to the present embodiment. As shown in FIG. 6, the client terminal 2 has a CPU (Central Processing Unit) 20, a ROM (Read Only Memory) 21, a RAM (Random Access Memory) 22, a direction sensor 23, a GPS measurement section 24, a speaker 25, an operation input section 26, an audio data memory 29, a display control section 30, a display section 31, and a network interface (I/F) 32. Hereinafter, each of the constituent elements will be described.

Direction Sensor

The direction sensor 23 detects the orientation of the client terminal 2, and outputs direction information which shows the detected orientation. More specifically, as shown in FIG. 5, a direction which is directed to the surface opposite from the surface including the display section 31 of the client terminal 2 is detected as the orientation of the client terminal 2. Note that, as described above, the present embodiment is not limited to this, and the direction sensor 23 may output, for example, a direction which another surface or a specific part of the client terminal 2 is facing as direction information.

GPS Measurement Section

The GPS (Global Positioning System) measurement section 24 detects the position which the client terminal 2 is presently at, by receiving radio waves from a GPS satellite, and outputs the detected present position information (longitude, latitude and altitude). Note that the GPS measurement section 24 is an example of a position information acquisition section which detects the present position of the client terminal 2, based on an acquisition signal from the outside. The client terminal 2 may have, other than the GPS measurement section 24, a position information acquisition section which detects, for example, the present position by transmission/reception, short distance communication or the like, such as WiFi, a mobile phone, a PHS, or a smart phone.

Operation Input Section

The operation input section 26 has a function which detects various operation inputs by a user. The operation input section 26 is implemented by a physical key group, such as buttons, switches or dials, or is implemented by a touch panel or the like which detects user operation inputs to a display screen. The operation input section 26 according to the present embodiment detects a zoom operation input by the user, and outputs the zoom operation input to the CPU 20.

Speaker

The speaker 25 has a DAC (digital analog converter), an amplifier (amplifying circuit) and the like, and has a function which outputs (reproduces) sounds based on the audio data. The speaker 25 according to the present embodiment can reproduce sounds corresponding to the zoom position, in accordance with an output control by the CPU 20.

Display Control Section

The display control section 30 has a function which controls the content of the display screen displayed on the display section 31, in accordance with the control by the CPU 20 based on the program of the ROM 21. The display control section 30 according to the present embodiment performs control, for example, so as to display an operation screen for inputting a zoom operation.

Display Section

The display section 31 displays menu screens, various operation screens or the like, in accordance with the control of the display control section 30. The display section 31 is implemented, for example, by an LCD (Liquid Crystal Display), an OLED (Organic Light-Emitting Diode) or the like.

Network I/F

The network I/F 32 is a communication module for performing transmission/reception of data with the server 1 via the network 3. For example, the network I/F 32 transmits present position information output from the GPS measurement section 24, direction information output from the direction sensor 23, and zoom distance information output from the CPU 20, and receives audio data retrieved by the server 1.

Audio Data Memory

The audio data memory 29 may be used, for example, by a flash memory such as a card type memory, or may be a recording medium such as a DVD (Digital Versatile Disc). In addition, the audio data memory 29 may not be such a removable memory medium, and may be a hard disk device.

Further, the audio data memory 29 stores the audio data received from the server 1. Further, the audio data memory 29 may store together the sound collection position information, classification information, sound collector information or the like which are added to the audio data received from the server 1.

CPU

The CPU 20 is a control section which controls each constituent element of the client terminal 2. Further, the CPU 20 according to the present embodiment judges the zoom distance based on a zoom operation detected by the operation input section 26. For example, the CPU 20 may calculate the zoom distance in accordance with a pressing intensity or a pressing time of the T button 261 or the W button 263, or may set a distance arbitrary input by a user as the zoom distance. Note that the zoom distance according to the embodiment of the present disclosure shows the distance from the position of the client terminal 2 to the zoom position (sound source (detection) position of target sounds).

Further, the CPU 20 performs control so as to transmit the present position information output from the GPS measurement section 24, the direction information output from the direction sensor 23, and the zoom distance information which shows the zoom distance, from the network I/F 32 to the server 1.

In addition, the CPU 20 functions as an output control section which performs control so as to output, from the speaker 25, the audio data corresponding to the zoom position received from the server 1. The output control section may perform control so as to process and output the audio data, based on a relative relation, for example, between the zoom position and the sound collection position of the audio data. More specifically, the output control section performs control so that the volume of this audio data increases as the sound collection position of the audio data approaches the zoom position.

Further, the output control section may perform control so as to combine and output a plurality of the audio data processed based on the above relative relation. For example, the output control section may perform control so as to output audio data by suppressing the audio data of a sound collection position far from the zoom position more than the audio data of a sound collection position close the zoom position.

In addition, the output control section may control the volume, pitch, or reproduction speed of the audio data in accordance with a zoom speed. Here, an output control of the audio data corresponding to the zoom speed will be described by using FIG. 7.

Figure 7:
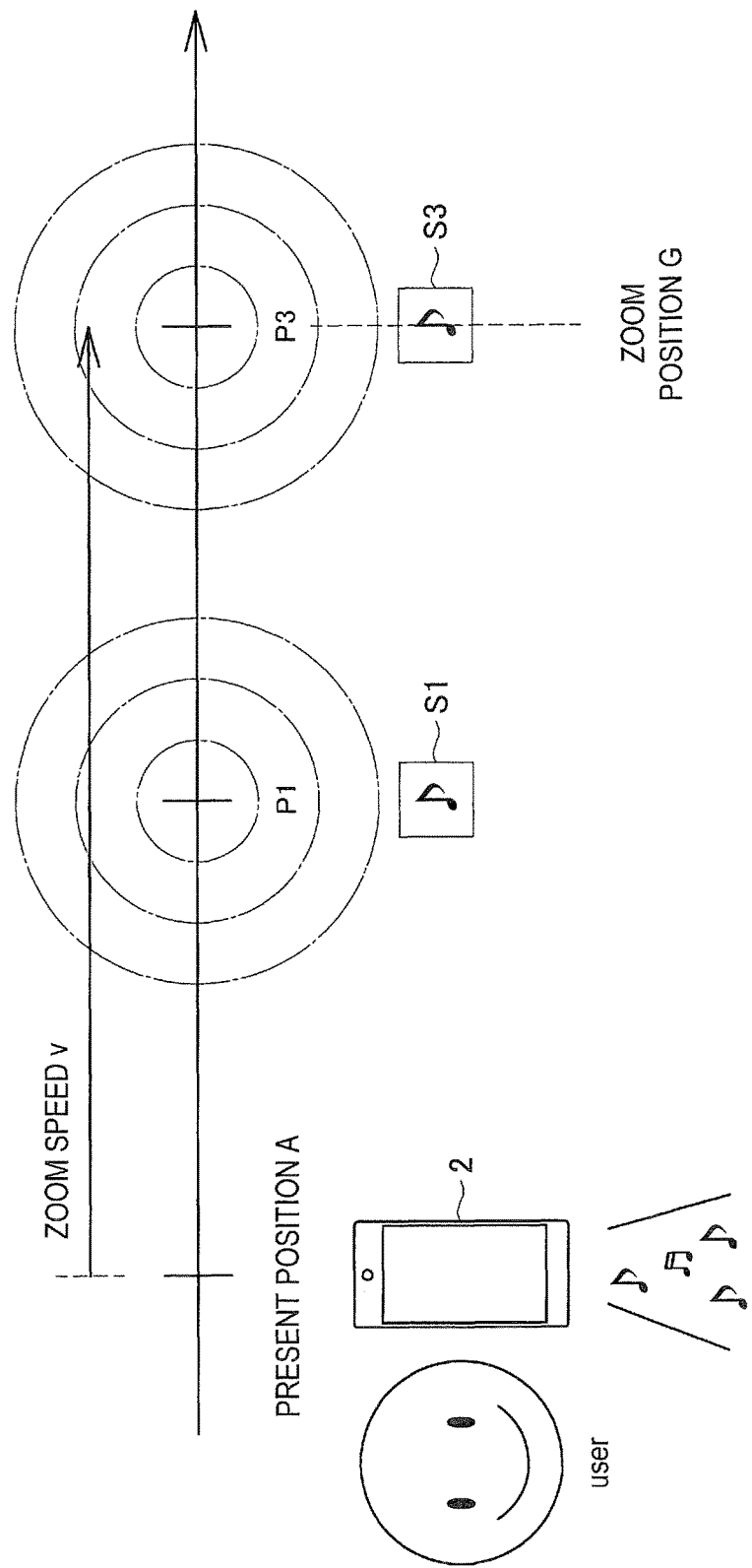
FIG. 7 is a figure for describing output control of audio data corresponding to the zoom speed.

As shown in FIG. 7, in the case where audio data S3 of a sound collection position P3, which is positioned in the vicinity of the zoom position G from the present position A of the client terminal 2, is output, the output control section controls the volume, pitch, or reproduction speed of the audio data S3 in accordance with the zoom speed v. In this way, a user can obtain an experience so that the user himself or herself is approaching the actual zoom position (sound source).

For example, it is possible for the output control section to simulate the Doppler effect, by setting the sound collection position P3 as a virtual sound source, and controlling the pitch of the audio data S3 based on the speed V of the sound waves and the zoom speed v from the virtual sound source.

In addition, in the case where audio data S1 of a sound collection position P1, which is positioned between the present position A and the zoom position G, is output by the retrieval section 14 of the server 1 as a retrieval result, and is transmitted from the server 1, the output control section may perform output control similar to that for the audio data S1. For example, as shown in FIG. 7, the output control section first reproduces the audio data S1 of the sound collection position P1 close to the present position A (or may reproduce by gradually raising the volume, pitch, or reproduction speed), in accordance with a zoom operation of a user. Next, the output control section suppresses the audio data S1, and reproduces the audio data S3 of the sound collection position P3 (or may reproduce by gradually raising the volume, pitch, or reproduction speed).

ROM and RAM

A program or the like for performing controls, which transmits the present position information, direction information, and zoom distance information to the server 1 in accordance with a zoom operation by a user, acquires audio data corresponding to the zoom position from the server 1, and outputs the audio data from the speaker 25, is stored in the ROM 21. Further, the RAM 22 is used as a work area when the CPU 20 executes the program stored in the ROM 21.

Heretofore, a configuration of the client terminal 2 according to an embodiment of the present disclosure has been described in detail. Next, the operation processes of the infinite zoom system according to the present embodiment will be described with reference to FIG. 8.

3. Operation Processes

FIG. 8 is a flow chart which shows the operation processes of the infinite zoom system according to the present embodiment. As shown in FIG. 8, first in step S100, the CPU 20 of the client terminal 2 judges whether or not a zoom operation is detected by the operation input section 26.

Next, in the case where a zoom operation is detected (S100/Yes), in step S103, the CPU 20 acquires present position information, direction information, and zoom distance information of the client terminal 2.

Next, in step S106, the client terminal 2 transmits the present position information, the direction information, and the zoom distance information to the server 1.

Next, in step S109, the retrieval section 14 of the server 1 retrieves audio data corresponding to the zoom position, based on the information received from the client terminal 2.

Next, in step S112, the server 1 transmits one or more of the retrieved audio data to the client terminal 2.

Next, in step S115, the CPU 20 (output control section) of the client terminal 2 performs control so as to reproduce (output) the received audio data from the speaker 25.

Heretofore, the operation processes according to the present embodiment have been described. To continue, a supplementation of the present embodiment will be described.

4. Supplementation

[4-1. Retrieval Based on Position and Direction]

In the above described embodiments, while audio data is requested by transmitting the present position information, direction information, and zoom distance information from the client terminal 2 to the server 1, in accordance with a zoom operation, the operation processes of the infinite zoom system according to the embodiment of the present disclosure are not limited to this. For example, in the case where the client terminal has a microphone, distant audio data may be requested by transmitting the present position information and direction information to the server 1, while audio data collected by the microphone is reproduced in accordance with a zoom operation. Hereinafter, a specific description will be made with reference to FIG. 9. Note that here, in addition to the configuration of the client terminal 2 described above with reference to FIG. 6 in the above described embodiments, a description will be made by using a client terminal 2' (not shown in the figure) which additionally has a microphone.

FIG. 9 is a flow chart which shows other operation processes of the infinite zoom system according to the present embodiment. As shown in FIG. 9, first in step S120, the CPU 20 of the client terminal 2' judges whether or not a zoom operation is detected by the operation input section 26.

Next, in the case where a zoom operation is detected (S120/Yes), the CPU 20 (output control section) processes audio data collected by the microphone in accordance with the zoom operation, and performs control so as to reproduce the audio data from the speaker 25. Specifically, for example, the output control section emphasizes the sounds of the direction in which the client terminal 2' is facing, in accordance with a zoom-in (telephoto) operation, and performs reproduction (output) control so that the sounds of the zoom-in direction come closer.

Next, in step S123, the CPU 20 acquires present position information and direction information of the client terminal 2'.

Next, in step S126, the client terminal 2' transmits the present position information and the direction information to the server 1.

Next, in step S129, the retrieval section 14 of the server 1 retrieves audio data corresponding to the zoom position, based on the information received from the client terminal 2'. For example, in the case where a relative relation between the sound collection position of each of the audio data stored in the audio data DB 13 and the present position of the client terminal 2' is a relation such as that shown in FIG. 4, the retrieval section 14 outputs the audio data of the sound collection positions P1, P3, and P5, which are positioned in the vicinity of the axial line L, as a retrieval result.

Next, in step S132, the server 1 transmits one or more of the retrieved audio data to the client terminal 2'.

Note that the server 1 may transmit audio data in the sequence from audio data of the sound collection position nearest to the present position of the client terminal 2', from among the one or more of the retrieved audio data. Further, the processes shown in the above steps S123 to S132 may be performed in parallel with the process shown in step S122.

In this way, the client terminal 2' can acquire in advance distant audio data of a direction in which the client terminal 2' is facing.

Next, in step S138, when a zoom-in operation is continuously performed, and the processing of the audio data collected by the microphone reaches a limit, the CPU 20 (output control section) of the client terminal 2' performs control so as to reproduce the distant audio data received from the server 1. Further, in the case where a plurality of the audio data is received from the server 1, the CPU 20 (output control section) may perform control so as to reproduce audio data in the sequence from the audio data of the sound collection position nearest to the present position of the client terminal 2'.

Heretofore, other operation processes according to the present embodiment have been described. Note that, besides this, in the above described client terminal 2 which does not have a microphone, steps S123 to S132 shown in FIG. 9 may be performed, and distant audio data of a direction in which the client terminal 2 is facing may be acquired in advance. In this case, for example, the client terminal 2 performs control so as to reproduce audio data in the sequence from the audio data of the sound collection position nearest to the present position of the client terminal 2, in accordance with a zoom-in operation.

[4-2. Sorting Corresponding to Classification]

Next, in the case where classification information, which shows a classification of the sounds, is added to the audio data received from the server 1, the CPU 20 (output control section) may reproduce the audio data upon sorting the audio data in consideration of this classification information. For example, the output control section may sequentially reproduce only the audio data of a famous spot based on the classification information, in accordance with a zoom operation.

[4-3. Display of Sound Collection Information and the Like]

Next, in the case where sound collector information (acquirer information) of the data is added to the audio data, the display control section 30 may perform control so as to display the sound collector information on the display section 31. Further, the display control section 30 may perform control so as to display the sound collection position based on the sound collection position information. The display of the sound collection position may be a place name, or may be displayed on a map. Further, the display control section 30 may perform control so as to display, on the display section 31, a zoom distance or a zoom magnification from the present position to the sound collection position.

Further, in the case where image data (still image/moving image) captured at the sound collection position is added to the audio data, the display control section 30 may perform control so as to display the image data on the display section 31, along with reproduction of the audio data.

[4-4. Another Example of a Zoom Operation Screen]

In the above described embodiments, while an example of a zoom operation screen has been shown with reference to FIG. 5, the zoom operation screen according to the present embodiment is not limited to this, and a zoom button may be displayed along with a through image, for example, in a client terminal 2" which additionally includes a camera.

Specifically, as shown in FIG. 10, a through image 311 captured by a camera 33 included on the rear surface of the client terminal 2" is displayed in real time on the display section 31, and a zoom operation screen 260 is additionally displayed. As shown in FIG. 10, a zoom dial button 265 is displayed on the zoom operation screen 260. A user can perform a zoom-in (telephoto) operation by turning the zoom dial button 265 in the T direction, and can perform a zoom-out (wide angle) operation by turning the zoom dial button 265 in the W direction. In this way, the user can adjust the focus by facing the camera 33 to a position (sound source) of the sounds to be heard, and can perform a zoom operation.

Further, in the case where image data captured at the sound collection position is added to the audio data corresponding to the zoom position received from the server 1, the client terminal 2" may display the through image 311 by switching this image data.

[4-5. Force Sense Data and Smell Sense Data]

In the above described embodiments, while a description has been made by using audio data as an example of sensory data corresponding to the zoom position, the sensory data according to the present embodiment may be, other than audio data, force sense data or smell sense data.

That is, the client terminal according to the present embodiment can continuously perform a virtual zoom in a direction in which the client terminal is facing, and can output force sense data or smell sense data corresponding to the zoom position. In this way, a user can continuously perform a virtual infinite zoom of a direction in which the client terminal is facing, and can experience tactile senses and smells from all parts of the word, for example, by enabling the server 1 to retrieve force sense data or smell sense data detected throughout the world in advance.

Note that, in the present embodiment, while the specific output method of the force sense data or smell sense data is not particularly limited, it may be implemented, for example, by a method such as shown hereinafter.

The force sense data may be output (reproduce a tactile sense), for example, by a force sense device such as the tactile pin disclosed in JP 2002-366025A, the transformable shape memory alloy disclosed in JP 2006-242986A or the like, as the output method of the force sense data.

Further, the smell sense data may be output (reproduce a smell) by a smell generation device which discharges smell components stored in advance, or discharges components for generating smells in combination with each other, as an output method of the smell sense data.

Heretofore, output of force sense data or smell sense data according to the zoom position has been described as another example of sensory data. Note that the client terminal may control the output intensity of the force sense data or smell sense data, in accordance with the zoom speed. Further, other than force sense data or smell sense data, in the infinite zoom system according to the present embodiment, it is possible to experience wind pressure of the zoom position or wind pressure corresponding to the zoom speed, by using a blowing device such as an electric fan. Further, in the infinite zoom system according to the present embodiment, plural types of sensory data corresponding to the zoom position may be output in combination with each other.

In addition, other than a smart phone, mobile terminal or the like, the client terminal, which includes each of the above described devices (force sense device, smell generation device, and blowing device), may be, for example, a vehicle. Specifically, it is possible for audio data corresponding to the zoom position to be reproduced from a vehicle speaker, tactile sense of the zoom position to be reproduced by including a force sense device on the seat or steering wheel in contact with the user himself or herself, and wind pressure and temperature of the zoom position to be reproduced by using a vehicle air conditioning apparatus.

5. Conclusion

As described above, in an infinite zoom system according to the present embodiment, an experience such as just like making a world trip can be provided, by sequentially outputting sensory data of the direction in which a client terminal is facing, in accordance with a zoom operation.

It should be understood by those skilled in the art that various modifications, combinations, sub-combinations and alterations may occur depending on design requirements and other factors insofar as they are within the scope of the appended claims or the equivalents thereof.

For example, in the above described embodiments, while the client terminal 2 acquires audio data from the server 1, the acquisition destination of the audio data according to the present embodiment is not limited to a server. For example, the acquisition destination of the audio data may be an unspecified number of servers or PCs (personal computers) on the internet, which have the functions of the audio data DB 13 and the retrieval section 14.

Further, the configuration of the client terminal according to the present embodiment is not limited to the example shown in FIG. 6. For example, the client terminal according to the present embodiment may have, in addition to the configuration shown in FIG. 6, a configuration which further corresponds to the audio data DB 13 and the retrieval section 14. In this case, the client terminal according to the present embodiment can locally retrieve distant audio data corresponding to the zoom position.

Further, in the above described embodiments, while the zoom position is changed in accordance with a zoom operation by a user, the changing of the zoom position according to the embodiment of the present disclosure may be performed automatically. For example, the client terminal 2 may automatically zoom in the direction in which the client terminal 2 is facing, with a prescribed zoom speed set in advance.

Further, in the above described embodiments, while a description has been made as an example in the case where audio data of a location, in the direction in which the client terminal is facing in a roughly horizontal direction, is sequentially reproduced in accordance with a zoom operation, the infinite zoom system according to the present embodiment is not limited to this.

For example, in the case where the client terminal is facing upwards, audio data collected in the sky may be reproduced, in accordance with a zoom operation. Further, in the case where the client terminal is facing downwards, audio data collected in the earth (or in the sea), or audio data collected on the opposite side of the globe, may be reproduced, in accordance with a zoom operation.

Additionally, the present technology may also be configured as below:

(1) A server including:

a reception section which receives, from a client terminal, present position information showing a position of the client terminal, and direction information showing an orientation of the client terminal;

a retrieval section which retrieves sensory data to which detection position information is added corresponding to a position in a vicinity of an axial line extending in a direction shown by the direction information from the position of the client terminal; and a transmission section which transmits the sensory data retrieved by the retrieval section to the client terminal.

(2) The server according to (1), wherein the reception section further receives zoom distance information showing a distance from the position of the client terminal to a zoom position, and wherein the retrieval section retrieves the sensory data to which detection position information is added corresponding to a position in the vicinity of the axial line extending in the direction shown by the direction information from the position of the client terminal, and surrounding the distance shown by the zoom distance information from the position of the client terminal.

(3) The server according to (1) or (2), wherein the sensory data is data detected by a sensor installed at a position shown by the detection position information added to the sensory data.

(4) The server according to any one of (1) to (3), wherein the sensory data is at least one of audio data, force sense data, or smell sense data.

(5) The server according to any one of (1) to (4), wherein the present position information and the detection position information are three dimensional position information which further includes altitude information in addition to latitude and longitude information.

(6) The server according to any one of (1) to (5),
wherein acquirer information of the sensory data is added to the sensory data.
(7) The server according to any one of (1) to (6),
wherein classification information of the sensory data is added to the sensory data.
(8) The server according to any one of (1) to (7),
wherein image data captured at a detection position of the sensory data is added to the sensory data.
(9) A client terminal including:
a transmission section which transmits present position information showing a position of a client terminal, and direction information showing an orientation of the client terminal;
a reception section which receives sensory data to which detection position information is added corresponding to a position in a vicinity of an axial line extending in a direction shown by the direction information from the position of the client terminal; and
an output control section which performs control in a manner that the sensory data received by the reception section is output.
(10) The client terminal according to (9),
wherein the transmission section further transmits zoom distance information showing a distance from the position of the client terminal to a zoom position, and
wherein the reception section receives the sensory data to which the detection position information is added corresponding to a position in the vicinity of the axial line extending in the direction shown by the direction information from the position of the client terminal, and surrounding the distance shown by the zoom distance information from the position of the client terminal.
(11) The client terminal according to (9) or (10),
wherein the output control section performs control in a manner that the sensory data is processed and output based on a relative relation between a zoom position and the position shown by the detection position information added to the sensory data.
(12) The client terminal according to (11),
wherein, in the case where a plurality of pieces of the sensory data are received by the reception section, the output control section performs control in a manner that the plurality of processed pieces of sensory data are output in combination with each other based on the relative relation.
(13) The client terminal according to any one of (9) to (12),
wherein the sensory data is audio data, and
wherein the output control section controls a pitch of the audio data based on a zoom speed.
(14) The client terminal according to (13),
wherein the output control section controls the pitch of the audio data in a manner that a Doppler effect is simulated.
(15) The client terminal according to any one of (9) to (14),
wherein the sensory data is audio data, and
wherein the output control section controls a reproduction speed of the audio data based on a zoom speed.
(16) The client terminal according to any one of (9) to (15),
wherein the sensory data is force sense data or smell sense data, and
wherein the output control section controls an output intensity of the force sense data or smell sense data based on a zoom speed.
(17) The client terminal according to any one of (9) to (16),
wherein a zoom position automatically changes at a prescribed speed in the direction shown by the direction information.

(18) The client terminal according to any one of (9) to (16), further including:
an operation input section,
wherein a zoom position changes in accordance with a zoom operation by a user detected by the operation input section.
(19) A program for causing a computer to function as:
a transmission section which transmits present position information showing a position of a client terminal, and direction information showing an orientation of the client terminal;
a reception section which receives sensory data to which detection position information is added corresponding to a position in a vicinity of an axial line extending in a direction shown by the direction information from the position of the client terminal; and
an output control section which performs control in a manner that the sensory data received by the reception section is output.

What is claimed is:
1. An information processing apparatus, comprising:
a first sensor, and
circuitry configured to:
    determine a sensing position of the first sensor;
    determine that the sensing position of the first sensor satisfies a positional relation with respect to a position of the information processing apparatus, wherein the positional relation indicates that the first sensor is present within a determined distance from an axis along a zoom position of a zoom operation executed by the information processing apparatus and the position of the information processing apparatus;
    retrieve first sensory data sensed by the first sensor, based on a determination that the sensing position of the first sensor satisfies the positional relation with respect to the position of the information processing apparatus; and
    receive second sensory data sensed by a second sensor, based on the determination that the sensing position of the first sensor fails to satisfy the positional relation with respect to the position of the information processing apparatus.
2. The information processing apparatus according to claim 1, wherein the circuitry is further configured to retrieve third sensory data from a plurality of sensors simultaneously.
3. The information processing apparatus according to claim 1,
    wherein the second sensory data is categorized and stored in a database of a server, wherein the server is communicably coupled to the information processing apparatus, and
    wherein the second sensory data is categorized based on a type of location of the second sensor.
4. The information processing apparatus according to claim 1,
    wherein the circuitry is further configured to retrieve the second sensory data of a determined category from a database of a server, wherein the server is communicably coupled to the information processing apparatus, and
    wherein the database is configured to store the second sensory data categorized based on a type of location of the second sensor.

5. The information processing apparatus according to claim 1, wherein information that indicates an acquirer of the second sensory data is added to the second sensory data.

6. The information processing apparatus according to claim 1, wherein the first sensory data is at least one of audio data, force sense data or smell sense data.

7. The information processing apparatus according to claim 1, further comprising an output control section configured to output one of the first sensory data or the second sensory data.

8. The information processing apparatus according to claim 7,
wherein the first sensory data and the second sensory data are audio data, and
wherein the output control section is further configured to control a pitch of the audio data based on a zoom speed of the zoom operation executed by the information processing apparatus.

9. The information processing apparatus according to claim 8, wherein the output control section is further configured to control the pitch of the audio data to simulate a Doppler effect.

10. The information processing apparatus according to claim 7,
wherein the first sensory data and the second sensory data are audio data, and
wherein the output control section is further configured to control reproduction speed of the audio data based on a zoom speed of the zoom operation executed by the information processing apparatus.

11. The information processing apparatus according to claim 7,
wherein the first sensory data and the second sensory data are one of force sense data or smell sense data, and
wherein the output control section is further configured to control an output intensity of the one of force sense data or the smell sense data based on a zoom speed of the zoom operation executed by the information processing apparatus.

12. An information processing apparatus, comprising:
circuitry configured to:
recognize a positional relation of a data collection position of a sensor and a position of the information processing apparatus, wherein the data collection position corresponds to a location where data is collected by the sensor;
determine, based on the positional relation, that the data collection position is within a determined distance from an axis along a zoom position of a zoom operation executed by the information processing apparatus and the position of the information processing apparatus; and
output the data collected at the data collection position based on the determination that the data collection position is within the determined distance of the zoom position.

13. An information processing apparatus, comprising:
circuitry configured to:
recognize a positional relation of a data collection position of a sensor and a position of the information processing apparatus, wherein the data collection position corresponds to a location where data is collected by the sensor;
determine, based on the positional relation, that the data collection position is within a determined distance from an axis along a zoom position of a zoom operation executed by the information processing apparatus and the position of the information processing apparatus; and
output the data collected at the data collection position based on the determination that the data collection position is within the determined distance of the axis.

14. An information processing method, comprising:
in an information processing apparatus that includes a first sensor:
determining a sensing position of the first sensor;
determining that the sensing position of the first sensor satisfies a positional relation with respect to a position of the information processing apparatus, wherein the positional relation indicates that the first sensor is present within a determined distance from an axis along a zoom position of a zoom operation executed by the information processing apparatus and the position of the information processing apparatus;
retrieving first sensory data sensed by the first sensor, based on a determination that the sensing position of the first sensor satisfies the positional relation with respect to the position of the information processing apparatus; and
receiving second sensory data sensed by a second sensor, based on the determination that the sensing position of the first sensor fails to satisfy the positional relation with respect to the position of the information processing apparatus.

15. A non-transitory computer-readable medium having stored thereon, computer-executable instructions which when executed by an information processing apparatus, cause the information processing apparatus to execute operations, the operations comprising:
in the information processing apparatus that includes a first sensor:
determining a sensing position of the first sensor;
determining that the sensing position of the first sensor satisfies a positional relation with respect to a position of the information processing apparatus, wherein the positional relation indicates that the first sensor is present within a determined distance from an axis along a zoom position of a zoom operation executed by the information processing apparatus and the position of the information processing apparatus;
retrieving first sensory data sensed by the first sensor, based on a determination that the sensing position of the first sensor satisfies the positional relation with respect to the position of the information processing apparatus; and
receiving second sensory data sensed by a second sensor, based on the determination that the sensing position of the first sensor fails to satisfy the positional relation with respect to the position of the information processing apparatus.

* * * * *